United States Patent [19]

Riedel et al.

[11] Patent Number: 5,462,481
[45] Date of Patent: Oct. 31, 1995

[54] PROCESS AND APPARATUS FOR REGULATING THE SUPPLY OF FRESH AIR IN HIGH-SPEED TRAINS

[75] Inventors: Hans J. Riedel, Leipzig; Michael Schmerler, Halle/Saale, both of Germany

[73] Assignee: Hagenuk Fahrzeugklima GmbH, Schkeuditz, Germany

[21] Appl. No.: 195,517

[22] Filed: Feb. 14, 1994

[30] Foreign Application Priority Data

Feb. 12, 1993 [DE] Germany .............. 43 04 194.9

[51] Int. Cl.⁶ .................................. B61D 27/00
[52] U.S. Cl. .................. 454/70; 454/105; 454/112
[58] Field of Search .............. 454/70, 103, 105, 454/107, 112

[56] References Cited

U.S. PATENT DOCUMENTS 5,009,148  4/1991  Karg et al. .............. 454/112 X

FOREIGN PATENT DOCUMENTS 3603608  8/1987  Germany .............. 454/112
3603802  8/1987  Germany .............. 454/103
 315365 12/1988  Japan .................. 454/70
 178207  7/1993  Japan .................. 454/105

*Primary Examiner*—Harold Joyce
*Attorney, Agent, or Firm*—Cohen, Pontani, Lieberman, Pavane

[57]  ABSTRACT

A process and apparatus for regulating the quantity of fresh air in high-speed trains by means of pressure-wave valves. A signal for adjusting a drive unit is determined from the passenger count and outside temperature. This drive unit causes a stop fork to move into a flap stop position of the valve in the "open" operating mode so that the required amount of fresh air can be supplied. The process according to the invention results in a considerable saving on energy, since only the absolutely necessary amount of fresh air need be heated or cooled and the period of time in which ventilation can be used rather than cooling is lengthened.

18 Claims, 1 Drawing Sheet

PROCESS AND APPARATUS FOR REGULATING THE SUPPLY OF FRESH AIR IN HIGH-SPEED TRAINS

BACKGROUND OF THE INVENTION

1. Field of the Invention

This invention relates to a process and apparatus for regulating quantities of fresh air in high-speed trains by means of pressure-wave valves.

2. Description of the Prior Art

Pressure-wave valves are typically utilized for the protection of equipment, through which a gaseous or vaporous medium, particularly air, flows, against pressure waves or increased air velocity, particularly in ventilation and/or air conditioning systems. From British Pat. No. 569,013, for example, a pressure wave protective flap is known having a frame which can be mounted in a ventilating duct and to which slats, constructed as articulated flaps with V-shaped cross section and a swivel axis at the vertex, are, independently of each other, supported rotatably, about several mutually parallel axes and which, when a given air velocity is exceeded and/or in the case of increased air pressure, are acted upon, in the direction of closing and thereby close off the duct cross section automatically until the air velocity and/or the air pressure have dropped to normal value.

A V-shaped cross section is also shown by the articulated flap-like slats according to German Utility Model (DE-GM) 7 133 893 which relates to a ventilation window for housings of exposed transformer stations. In order to avoid the escape of hot or even burning gases through the ventilating window to the outside in the case of a short circuit, the articulated flap-like slats are supported on the narrow sides thereof by means of bearing pins in bearing holes of the frame in such a manner that they are swung by the internal excess pressure into a closed position, wherein they overlap each other. To avoid vibration or chattering of the free-swingingly suspended flaps, due to external influences, for instance, vibrations or also changing air pressure, the exposed edges of these articulating flap-like slats can be restoringly spring-loaded by a yielding force, specifically springs.

In connection with high speed trains, such valves are designed to close for a specified period of time in the event of impermissibly great differences in pressure between the interior of the coach and the surroundings, thereby preventing impermissible changes in the interior pressure of the coach itself and damage to the ventilation and air conditioning systems thereof. A device responsive to close a flap in response to an impermissible increase in interior pressure is, for example, disclosed in German Published Specification DE-PS 36 18 292.

It is disadvantageous that the valves of all previously known pressure valve devices, including those described above, are only actuatable into one of two possible positions, fully open or fully closed. While such operation is consistent with the protection of equipment from pressure waves and sudden increase s in air velocity, it does not provide any means for regulating the amount of air intake while pressure differentials are at permissible levels.

Accordingly, it is an object of the present invention to provide a process by which the flow of air into a high speed movable compartment, such as a train car, may be economically regulated in accordance with such variable factors as the number of passengers on board and the temperature outside the compartment.

It is a further object of the present invention to provide an improved pressure-wave valve apparatus which is capable of performing the enhanced flow regulation which characterizes the aforementioned method.

SUMMARY OF THE INVENTION

The aforementioned objects, as well as others which will become apparent to those skilled in the art, are achieved by a drive unit which is operable to adjust the position of the valve flap, during an open mode thereof, in accordance with the number of passengers in a compartment and the ambient temperature outside the compartment. Specifically, the drive unit receives a signal indicative of a position selected in accordance with the aforementioned passenger and temperature data and is operable to move a stop member into a position which determines the open position of the valve flap. Thus, by adjusting the position of the stop member, the amount of fresh air which can be directed into the compartment while the pressure wave valve is open can be advantageously regulated.

The process according to the present invention results in considerable savings on energy, since no more fresh air than is absolutely necessary for the comfort of the passengers in the associated compartment need be heated or cooled. Moreover, the period of time for which ventilation, rather than heating or cooling, is sufficient is substantially extended.

In accordance with the present invention, the desired position of the stop member, and thus the degree of flap opening, is periodically monitored and updated, if necessary, via a controller or regulating unit. In this manner, it is ensured that an immediate adjustment in the flap stop position of the valve can be effected in the event of changes in the factors governing the regulating of the quantity of fresh air, such as outside temperature or number of passengers.

According to a further feature of the invention, the required amount of fresh air can also be adjusted in accordance with additional factors, besides the number of passengers and outside temperature, which may also have an influence on fresh air requirements and which may therefore enhance energy efficiency.

A pressure-wave valve constructed in accordance with the present invention includes, as indicated above, a flap member movable between open and closed positions when an impermissible pressure differential is sensed between the interior of the compartment and the exterior of the compartment. A first drive unit is responsive to such a sensed differential and is operable to close the flap into a closed mode of operation. As indicated above, the pressure-wave valve of the present invention further includes a second drive unit which is connected with a stop fork. According to a preferred feature of the invention, this additional drive unit has a regulating or control unit which is connected with sensors. The regulating unit serves to interrogate these sensors at predetermined time intervals concerning the current status of the parameters according to which the flap stop position of the valve was adjusted, e.g. outside temperature and number of passengers.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

BRIEF DESCRIPTION OF THE DRAWINGS

An understanding of the present invention will be facilitated by the detailed description of an illustrative embodiment set forth herein in combination with reference to the annexed drawings, in which.

DETAILED DESCRIPTION OF THE PREFERRED EMBODIMENTS

Figure 1:
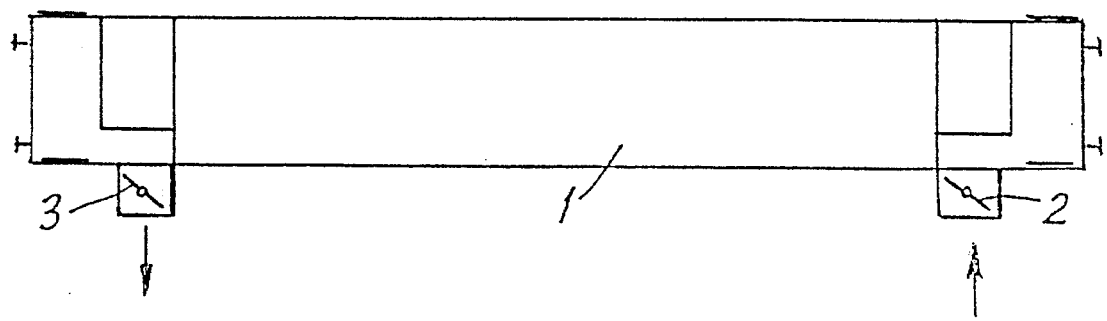
FIG. 1 is a schematic representation of an arrangement of pressure-wave valves in a passenger coach.

The arrangement of the pressure-wave valves is shown schematically in FIG. 1. The flap 2 represents the pressure-wave valve for the fresh air supply and flap 3 represents the pressure-wave valve for the guiding exhaust air. The two pressure-wave valves are arranged at an appropriate location on the coach body 1. The fresh air and recycle air are prepared in a known manner as mixed air in a device inside the coach. This air is supplied to the passengers. A portion of the air escapes as exhaust air via the pressure-wave valve 3.

Figure 2:
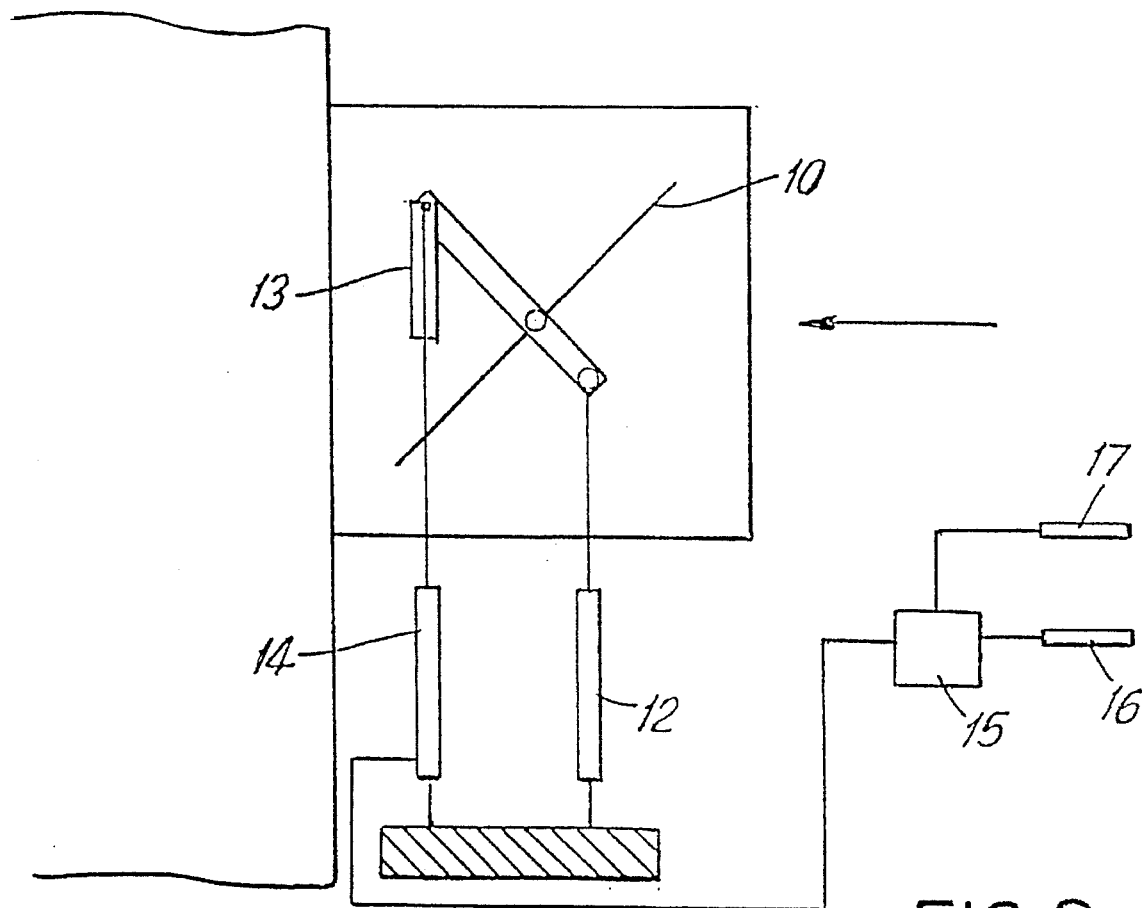
FIG. 2 illustrates a pressure wave valve constructed in accordance with the present invention.

With reference now to FIG. 2, the function of the device for regulating the quantity of fresh air by means of a pressure-wave valve will now be described. The flow of air is adjusted by means of the flap 10. Two adjusting devices 14 and 12 act on this flap by means of a suitable rod linkage. The pneumatic device 12 is controlled by a pressure evaluating unit which is conventional and therefore not shown. This pressure evaluating unit records the external pressure and internal pressure of the coach as well as the pressure gradients as the difference between the interior and exterior pressure increases. The evaluating unit sends a command to the adjusting device 12 as a signal. This adjusting device 12 is made to open or close as the case may be. In one embodiment, the adjusting device 12 is a fluid actuator that has a piston pivotally coupled to the flap 10.

In addition, this known arrangement is also provided with a second adjusting device 14 which positions the flap 10 in a determined manner independently from the adjusting device 12 when the pressure-wave valve is open. The adjusting device 14 displaces a stop fork 13 in such a way that the flap 10 is pressed against the stop of the fork 13 by the adjusting device 12 during the opening process. The adjusting device 14 also can be a fluid actuator that has a piston connected to the stop fork 13. The stop fork 13 is positioned by means of control pulses from the control unit 15 to the adjusting device 14. This control unit 15 processes signals of the outside temperature 17 and passenger count sensor 16. The quantity of air per passenger is adjusted on the basis of the signal from the sensor 17. The passenger count is determined e.g. by means of the spring suspension of the coach, occupied seats, or by other suitable methods by means of sensors 16. The evaluating unit determines the control signal for the adjusting drive 14 from these signals. A positional balance is achieved via corresponding feedback from the adjusting drive 14 to the control unit 16. The control unit 15 interrogates the two sensors 16 and 17 cyclically in specified time units, e.g. 5 minutes, and determines a new position for the adjusting device 14 if required by comparing the conditions sensed with those sensed during immediately preceding interrogations of the sensors.

Those skilled in the art will recognize changes and modifications which can be made to the present invention without departing from its spirit or scope. Accordingly, I intend to be limited only by the following claims.

The invention is not limited by the embodiments described above which are presented as examples only but can be modified in various ways within the scope of protection defined by the appended patent claims.

What is claimed is:

1. Process for regulating the supply of fresh air in a compartment adapted to convey passengers at high speed, comprising the steps of:

measuring ambient temperature outside said compartment;

estimating the number of passengers inside said compartment;

generating an adjusting signal based on the measured outside temperature and the estimated number of passengers; and adjusting an amount of fresh air delivered into said compartment based upon said adjusting signal by moving a stop fork member via a drive unit responsive to said adjusting signal into a flap stop position of a pressure-wave valve, thereby regulating an amount of fresh air which can be supplied to said compartment.

2. Process according to claim 1, further including a step of constantly checking a current status of the adjusting signal for the drive unit with a regulating unit.

3. Apparatus for regulating the supply of fresh air in a compartment adapted to convey passengers at high speed, comprising:

a pressure-valve having a flap movable between fully open and fully closed positions;

first drive means for moving said flap between said fully open and fully closed positions;

a stop member; and second drive means coupled to said stop member and operable to selectively move said stop member into a valve stop position and thereby maintain said flap in an intermediate position between said open and closed positions.

4. Apparatus according to claim 3, further including first sensing means for detecting at least one condition inside said compartment and second sensing means for detecting at least one condition outside said compartment and wherein said second drive unit includes a regulating unit coupled to said first and second sensing means.

5. Apparatus according to claim 4, wherein said first sensing means is adapted to provide a signal indicative of an approximate number of passengers within said compartment.

6. Apparatus according to claim 5, wherein said first sensing means is a weight sensor.

7. Apparatus according to claim 4, wherein said second sensing means is adapted to provide a signal indicative of ambient temperature outside said compartment.

8. Apparatus according to claim 3, wherein said first drive means is a fluid actuator having a first piston pivotally coupled to said flap.

9. Apparatus according to claim 8, wherein said second drive means is a fluid actuator having a second piston connected to said stop member.

10. Apparatus according to claim 9, further including a rigid member having a first end pivotally connected to said stop member and a second end pivotally connected to said first piston, wherein said flap member is secured to said rigid member between said first end and said second end so as to be independently movable by said first drive means and said second drive means.

11. A process for regulating the supply of fresh air in a compartment movable at high speed and adapted to receive and conveying passengers, comprising the steps of:

sensing in a first sensing step at least ambient temperature and pressure outside said compartment;

sensing in a second sensing step at least pressure and a number of passengers inside said compartment;

generating an adjusting signal in accordance with data obtained during said first and second sensing steps;

adjusting an amount of fresh air delivered into said compartment in accordance with the adjusting signal obtained during said generating step by moving a pressure-wave valve selectively movable into a closed position when a predetermined pressure differential is sensed between an interior of said compartment and an exterior of said compartment, a fully open position, and at least one intermediate position.

12. A method according to claim 11, wherein said adjusting step includes moving a stop member, via a drive unit operable in response to said adjusting signal, into a valve stop position for maintaining a pressure-wave valve flap in a first intermediate position during an open mode operation thereof.

13. A process according to claim 11, wherein said first sensing step comprises sensing ambient temperature outside said compartment and providing a signal indicative of said outside temperature to a controller.

14. A process according to claim 13, wherein said second sensing step includes sensing the weight of passengers within said compartment and providing a signal indicative thereof to said controller.

15. A process according to claim 14, further including moving a stop member, via a drive unit operable in response to said adjusting signal, into a valve stop position for maintaining a pressure-wave valve flap in an intermediate position during an open mode operation thereof.

16. A process according to claim 14, further including cyclically repeating said first and second sensing steps and comparing conditions sensed with those sensed during immediately preceding sensing steps.

17. A process according to claim 16, further including moving said valve flap into another intermediate position if a change is detected in one of said sensed conditions.

18. A process according to claim 11, further including cyclically repeating said first and second sensing steps, comparing conditions sensed with those sensed during immediately preceding sensing steps, and moving said valve flap into another intermediate position if a change is detected in one of said sensed conditions.

* * * * *